United States Patent
Gierer et al.

[11] Patent Number: 5,947,867
[45] Date of Patent: Sep. 7, 1999

[54] SAFETY SYSTEM FOR AN AUTOMATIC GEARBOX

[75] Inventors: Georg Gierer, Kressbronn; Harald Deiss, Ravensburg, both of Germany

[73] Assignee: ZF Friedrichshafen AG, Friedrichshafen, Germany

[21] Appl. No.: 09/077,623

[22] PCT Filed: Jan. 14, 1997

[86] PCT No.: PCT/EP97/00130

§ 371 Date: Jun. 12, 1998

§ 102(e) Date: Jun. 12, 1998

[87] PCT Pub. No.: WO97/26472

PCT Pub. Date: Jul. 24, 1997

[30] Foreign Application Priority Data

Jan. 18, 1996 [DE] Germany ............. 196 01 618

[51] Int. Cl.$^6$ .................................... F16H 61/12
[52] U.S. Cl. .............................. 477/906; 701/62
[58] Field of Search ................. 477/906; 701/62

[56] References Cited

U.S. PATENT DOCUMENTS

| | | | |
|---|---|---|---|
| 4,635,508 | 1/1987 | Tatsumi .................. | 477/906 X |
| 4,747,056 | 5/1988 | Yamamoto et al. . | |
| 5,033,328 | 7/1991 | Shimanaka ............. | 477/906 X |
| 5,191,814 | 3/1993 | Ando et al. ............ | 477/906 X |
| 5,209,141 | 5/1993 | Asayama et al. ...... | 477/906 X |
| 5,315,972 | 5/1994 | Judy et al. ............. | 477/906 X |
| 5,515,272 | 5/1996 | Sakai et al. ............ | 477/906 X |
| 5,521,818 | 5/1996 | Palansky et al. ....... | 477/906 X |
| 5,609,548 | 3/1997 | White et al. ........... | 477/906 X |
| 5,649,880 | 7/1997 | Tsutsui et al. ......... | 477/906 X |
| 5,846,162 | 12/1998 | Ito et al. ................ | 477/906 X |

FOREIGN PATENT DOCUMENTS

| | | |
|---|---|---|
| 0 130 827 A1 | 1/1985 | European Pat. Off. . |
| 0 316 358 B1 | 5/1989 | European Pat. Off. . |
| 0 459 274 A2 | 12/1991 | European Pat. Off. . |
| 0 668 455 | 8/1995 | European Pat. Off. . |
| 27 00 548 C2 | 7/1978 | Germany . |
| 38 43 101 A1 | 7/1989 | Germany . |
| 2 278 654 | 12/1994 | United Kingdom . |

OTHER PUBLICATIONS

"Einsatz des Viergang–Automatikgetriebes 4 HP 22 mit elekronisch–hydraulischer Steuerung", *Automobiltechnische Zeitschrift* 85 (1983) 6, pp. 401–405.

Japanese Abstract (M–1076) Jan. 31. 1991, vol. 15, No. 42 "Number of Revolutions Measuring System Abnormality Detecting Device for Automatic Transmisson".

*Primary Examiner*—Khoi Q. Ta
*Attorney, Agent, or Firm*—Davis and Bujold

[57] ABSTRACT

In an automatic transmission in which the electronic control instrument (13) detects, outside the circuits, a fault in the input values (18 to 20), the couplings and the brakes (A to F). When a fault is present for an extended period, the electronic control instrument (13) detects a symptom and switches to a replacement gear. Hereby maximum driveability is ensured without a diagnosis entry.

6 Claims, 8 Drawing Sheets

| COUPLING LOGIC | | | | | | | | | |
|---|---|---|---|---|---|---|---|---|---|
| | COUPLINGS | | | BRAKES | | | | FREE-WHEEL | |
| GEAR | A | B | C | D | E1 | E2 | F | F | E |
| R = R-GEAR | | | ● | | | | ● | | |
| N = NEUTRAL (P+N) | | | | | | | ● | | |
| D, 1ST GEAR | ● | | | | | | | ● | |
| D, 2ND GEAR | ● | | | | ● | ● | | | ● |
| D, 3RD GEAR | ● | | | ● | ● | | | | |
| 4, 4TH GEAR + WK | ● | ● | | ● | | | | | |
| D, 5TH GEAR + WK | | ● | | ● | ● | | | | |
| 2, 1ST GEAR | ● | | | | | | ● | | |
| EMERGENCY PROGRAM | ● | ● | | ● | | | | | |

● ACTIVE

FIG.2

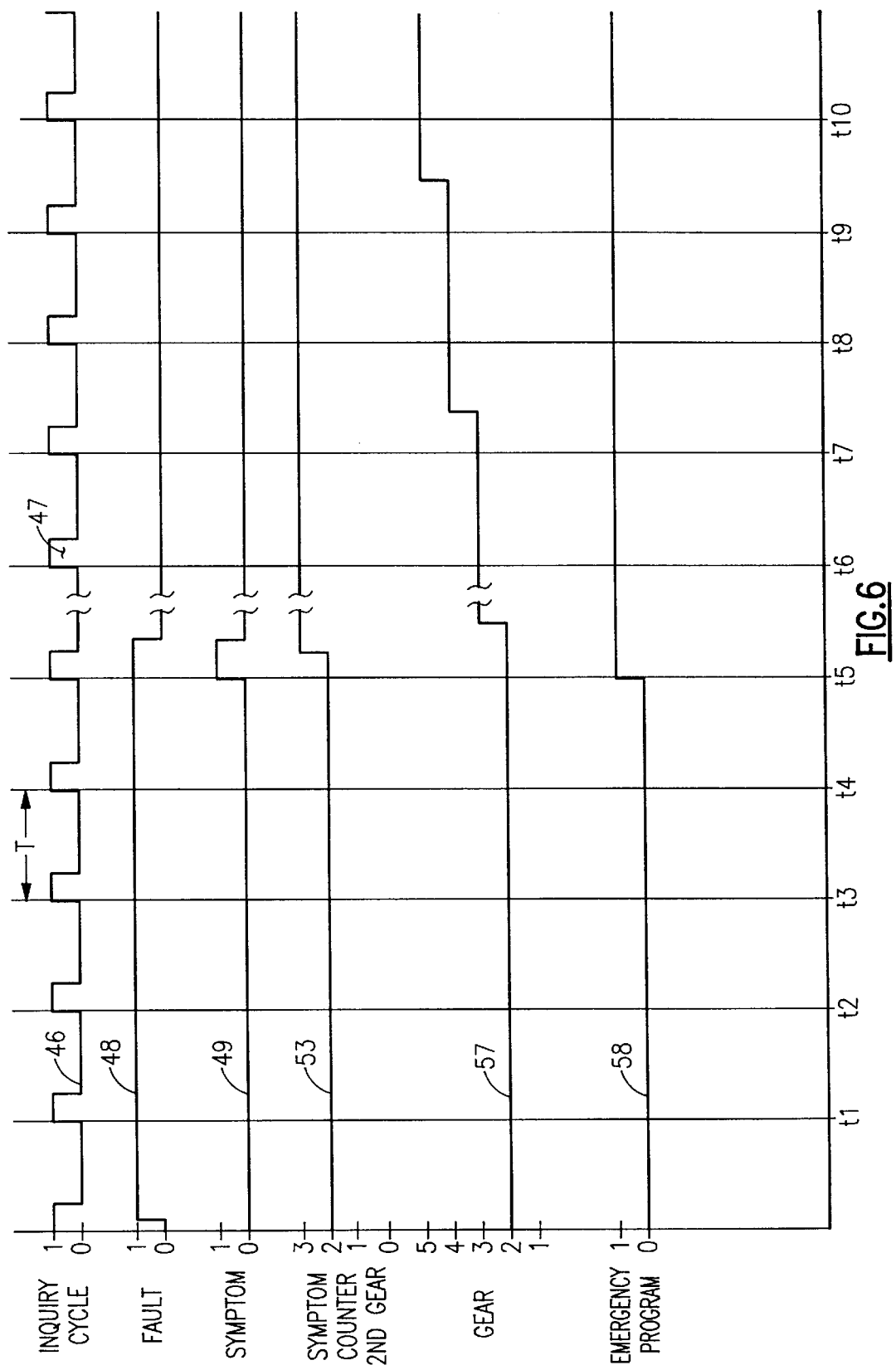

SAFETY SYSTEM FOR AN AUTOMATIC GEARBOX

The invention relates to a safety system for an automatic transmission in which the actual gear is monitored outside the circuits and when an error conditioned symptom appears it is switched to a replacement gear.

BACKGROUND OF THE INVENTION

In electrohydraulic automatic transmissions, it is generally customary to monitor the methodical operation in order to prevent situations critical to safety. The input signals made available by the sensors, the electromagnetic actuators, the electronic transmission control and, by fed back values, the clutches and brakes that participate in a gearshift, are monitored. In connection with this, EP-PS 0 316 358 discloses a safety system in which the automatic transmission switches to the highest gear in case of an error. The electromagnetic actuators and hydraulics are disposed in a manner such that even in the event of a total electronic system failure, the automatic transmission switches to the fifth gear.

A safety system for an automatic transmission is also known from DE-PS 27 00 548. It prevents a downshift from the highest gear by disengaging an electromagnetic valve when a fault occurs.

The prior art described is disadvantageous in that momentary faults immediately result in a switch to the highest gear or in maintaining the highest gear. In practice this means that, for example, a switch from the first to the fifth gear occurs in the extreme case.

The problem to be solved by the invention is thus to provide a safety system for an automatic transmission, which detects temporary faults and reacts with adequate flexibility.

SUMMARY OF THE INVENTION

The problem on which the invention is based is solved by monitoring the current gear outside the circuits via the measured transmission input and output speeds, wherein a fault detected by the transmission monitoring system present beyond a presettable period of time is interpreted as a symptom, with the safety system thus discontinuing normal operation when a symptom appears. With the discontinuance of the normal operation, the transmission switches from the current gear to a replacement gear. The replacement gear here corresponds to the next higher gear when the symptom appears during first to fourth gears. The replacement gear corresponds to the next lower gear when the symptom appears in fifth gear.

This solution has the advantage that large ratio steps are prevented. Thus, for example, the appearance of a symptom in second gear results in the transmission switching to third gear. An unnecessarily high load on the shafts and couplings is thereby prevented ensuring at the same time that the vehicle is driveable for as long as possible.

Another advantage is that an immediate change to the highest gear, as a result of an error, is prevented since according to the legal regulations this must be indicated as an exhaust relevant error.

In one embodiment of the invention, it is proposed that a symptom counter be provided for each gear. Upon the presence of a symptom, the counter reading is increased by one. If the counter reading exceeds a limit value, an emergency program is activated. This solution offers the advantage that a permanently damaged coupling is detected.

In another development, it is proposed that the emergency gear corresponds to fifth gear when the counter reading exceeds the limit value in one of the first four gears and that the emergency gear corresponds to fourth gear when the counter reading exceeds the limit value in fifth gear. The switchings here are carried out sequentially and are pressure modulated. If the counter reading exceeds the limit value, for example, in second gear, then the change to third gear takes place, followed by the change to fourth gear, and finally the change to fifth gear.

BRIEF DESCRIPTION OF THE DRAWINGS

An embodiment is shown in the drawings. In the drawings:

FIG. 2 is a table of the coupling logic;

FIG. 6 is a signal phase diagram.

DESCRIPTION OF THE PREFERRED EMBODIMENT(S)

Figure 1:
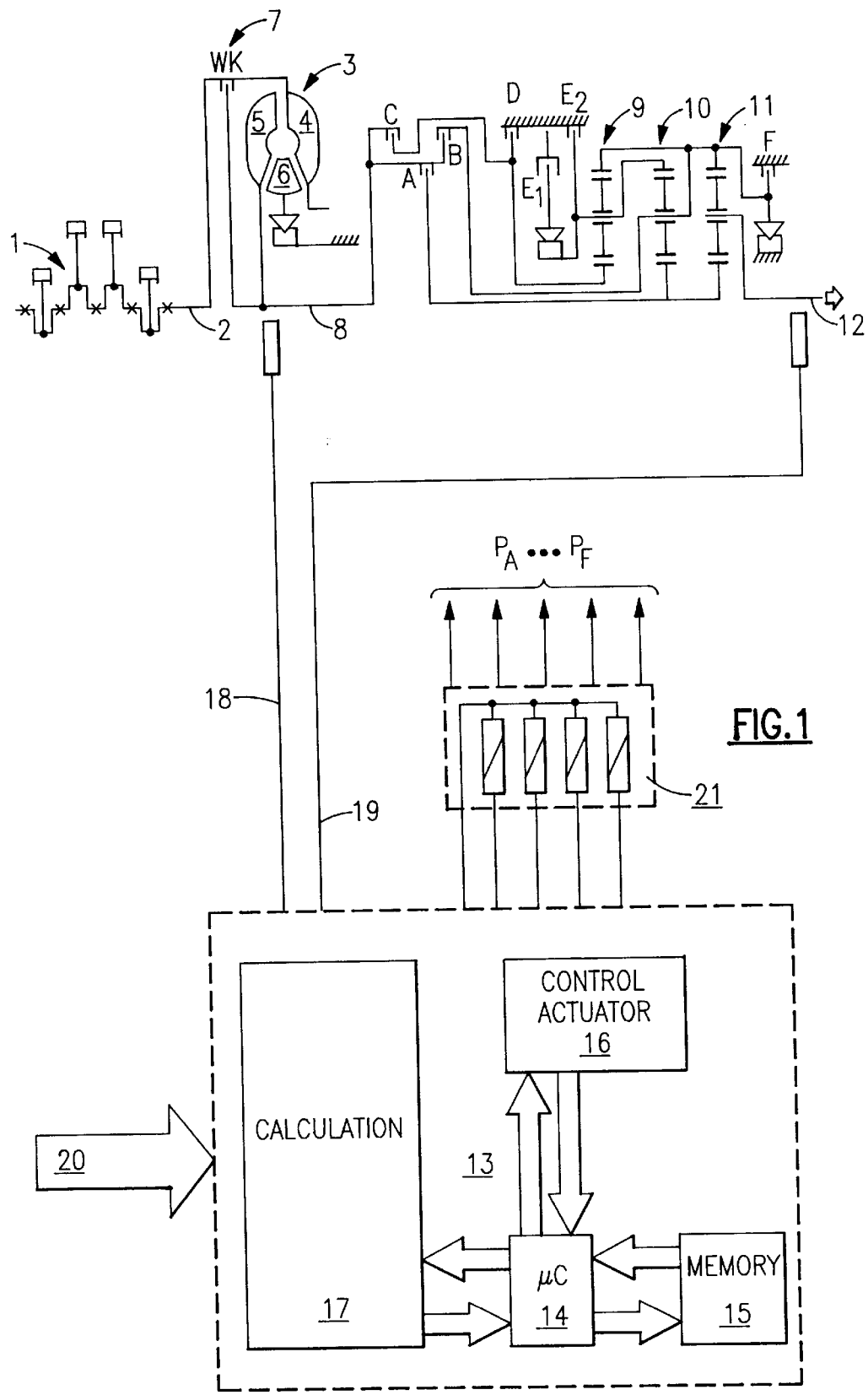
FIG. 1 is a system diagram of an automatic transmission.

FIG. 1 shows a system diagram for an automatic transmission. It comprises the mechanical part proper along with hydrodynamic converter 3 and couplings/brakes A to F, a hydraulic control instrument 21, and an electronic control instrument 13. The automatic transmission is driven by a driving unit 1, preferably an internal combustion engine, via an input shaft 2. The latter is firmly connected with an impeller 4 of a hydrodynamic converter 3. As it is known, the hydrodynamic converter 3 comprises the impeller 4, a turbine wheel 5 and a stator 6. A converter coupling 7 is situated in parallel to the hydrodynamic converter. The converter coupling 7 and the turbine wheel 5 lead to a turbine shaft 8. When the converter coupling 7 is actuated, the turbine shaft 8 has the same speed as the input shaft 2. The mechanical part of the automatic transmission consists of three consecutively disposed planet gear sets 9 to 11, the three couplings A, B and C, the brakes D, E1, E2 and F and two freewheels. The output takes place via a transmission output shaft 12. The latter leads to a differential, not shown, which drives, via two axle half shafts, the input gears of a vehicle. A gear step is selected by an adequate coupling-brake combination. The coordination of the coupling logic to the gear step can be seen in FIG. 2. Since the mechanical part is not relevant for a further understanding of the invention, a detailed description is omitted.

Depending on input values 18 to 20, the electronic control instrument 13 selects, via the hydraulic control instrument 21, an adequate gear step. The electromagnetic actuators are in the hydraulic control instrument 21. A microcontroller 14, a memory 15, function block control actuators 16 and a function block calculation 17 of the electronic control instrument 13 are shown as block diagrams, in a very simplified manner. In the memory 15 the data relevant to the transmission is deposited. Data relevant to the transmission is, for example, program data as well as diagnosis data. The memory 15 is usually an EProm, EEProm, or a buffered RAM. The data relevant for a switch curve in the function block 17 is calculated. The function block control actuator 16 serves to control the actuators which are in the hydraulic control instrument 21. Input values 20 are linked to the electronic control instrument 13. Input values 20 are, for example, the signal of a throttle valve, the signal of the torque generated by the internal combustion engine, the speed of the internal combustion engine and the temperature of the engine and of the hydraulic fluid of the automatic transmission. The data is usually made available by an engine control instrument that controls the internal combustion engine. This is not shown in FIG. 1. As additional input values, the electronic control instrument 13 receives the speed of the turbine shaft 18 and the transmission output speed 19.

Figure 3A:
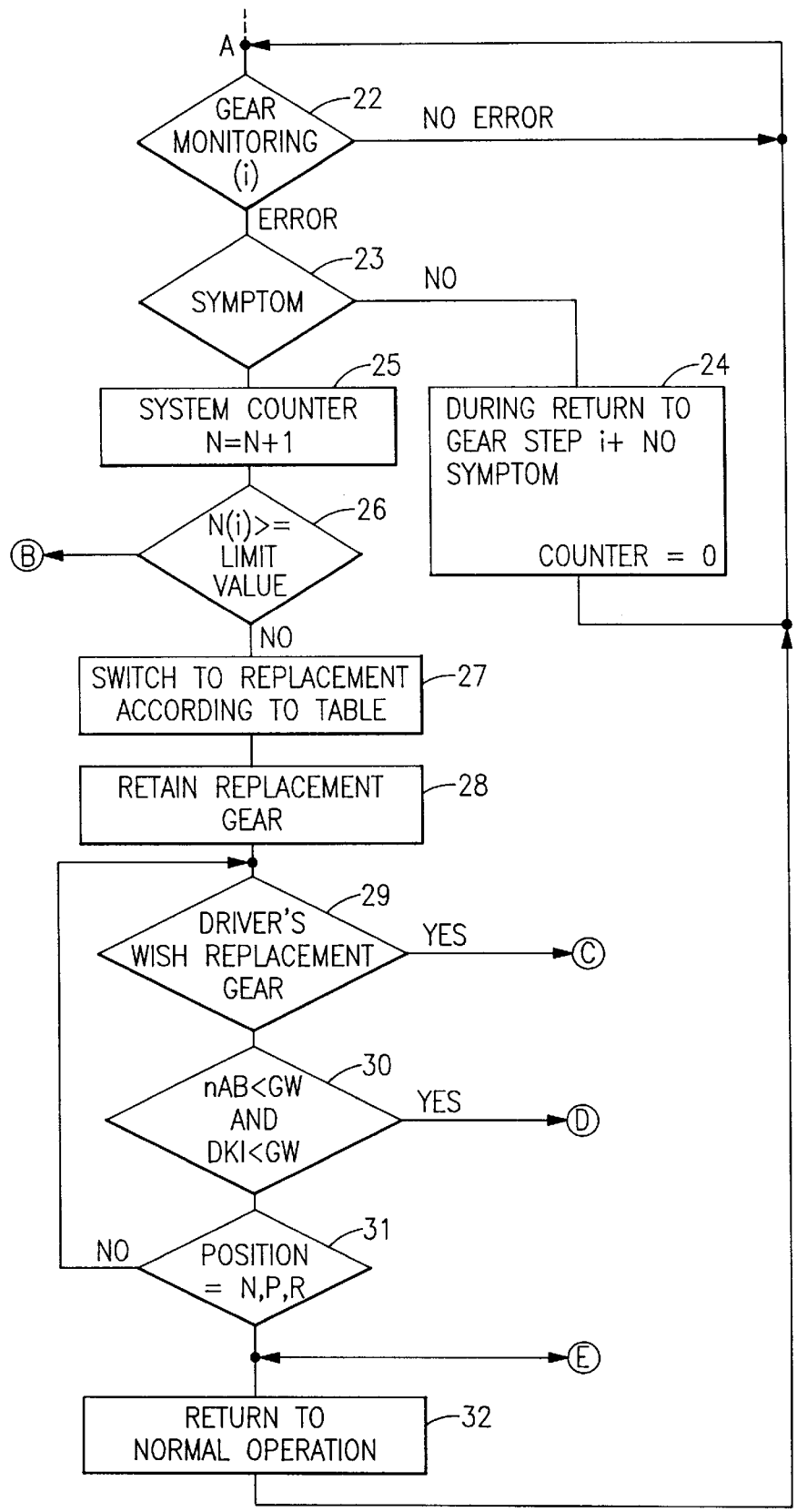
FIGS. 3A, 3B, 3C and 3D are program flow charts.

FIG. 3A shows part of a program flow chart for the safety system. The program flow chart begins at the gear monitoring inquiry, reference numeral 22. The gear monitoring tests the current gear, for example, second gear, according to the following definition:

$$nT(t)-nAB(t)\cdot i < \text{limit value}$$

nT: turbine speed nAB: output speed i: transmission ratio of the current gear.

If the result of the inquiry is that there is no error, the program returns to point A. If an error exists, it is tested at inquiry 23 whether a symptom is present. A symptom is present when a fault is constantly present for a certain period of time such as 50 mins. Other testing conditions for a symptom are:

period of time after a rest of the microcontroller 14>limit value; and time step after the end of a switch has lapsed; and oil temperature of the transmission>a limit value; and selector lever position is D, 4, 3, 2 or 1; and transmission output speed>limit value (nAB(t)>Gw); and turbine speed>a limit value (nT(t)>Gw).

Faults are to be understood as, for example, electromagnetic interference pulses on the speed signals, failure of the speed sensors, or hydraulic non-sliding resulting from soiling. If no symptoms are present, function block 24 follows. In function block 24 the counter associated with a gear is set to zero when returning to the gear monitoring step with no symptom having been detected. Thereafter, returns to point A. In the inquiry 23, if the test yields that a symptom is present, then in the function block 25 the counter reading of a symptom counter is increased by one. Each gear has its own symptom counter. In inquiry 26 it is tested whether the counter reading of the symptom counter, for example, the symptom counter for second gear, is higher than or equal to a limit value such as 3. If the result of the inquiry is that the counter reading is higher than or equal to the limit value, then the program branches out at point B. The branching point B is the start of a sub-program, which is described in relation to FIG. 3B. If the counter reading is less than the limit value, then function block 27 follows. The function block 27 causes the automatic transmission to discontinue normal operation and switch to a replacement gear. The replacement gear can be seen from the following table:

| Actual gear (G) | Replacement gear (G') |
|---|---|
| 1 | 2 |
| 2 | 3 |
| 3 | 4 |
| 4 | 5 |
| 5 | 4 |

As can be understood from the table, the automatic transmission switches, for example, from second to third gear as a replacement gear. The function block 28 causes the replacement gear to be retained. In inquiry 29 it is tested whether or not the driver wishes a gear of the same magnitude as the replacement gear. The driver's wish is to be understood as the performance required by the driver from the internal combustion engine, determined, for example, by the accelerator pedal position. Thus, a positive inquiry results when the driver actuates the accelerator pedal more than at the moment a symptom was detected. In the case of a positive inquiry, the program branches out at point C. The branching point C is explained in relation to FIG. 3C. If the result of the test in reference number 29 is that the driver's wish is different or less than the replacement gear, then it is tested in reference numeral 30 whether the transmission output speed and the throttle valve information are less than a limit value (DKI(t)<Gw and/or nAB(t)<Gw). The limit values are determined so that, in practice, the rolling out switches or the coasting switches fall below them. In the case of a positive answer, the program branches out at the program point D. The latter is explained in relation to FIG. 3D. If the inquiry is negative, reference numeral 31 follows with the inquiry of whether the driving position is in N, P or R. By driving position is to be understood the position of a selector lever. If this is not the case, then the flow chart branches back to the inquiry of reference numeral 29, about the driver's wish. If a positive inquiry results, the function block 32 follows. In function block 32 it is determined that the electronic transmission control returns back to normal operation. Thereafter, the program branches back to program point A, and the loop is closed.

Figure 3B:
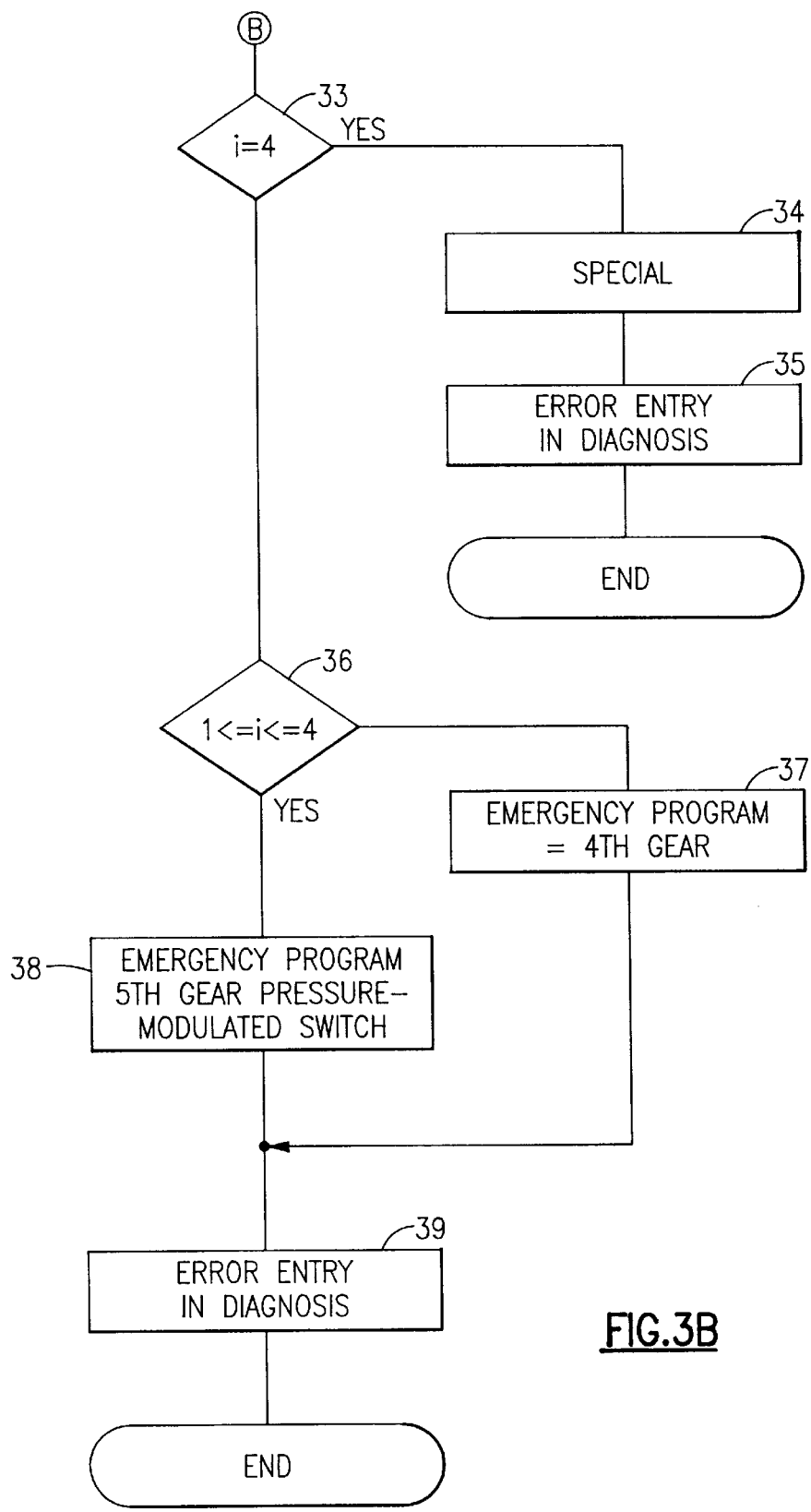

FIG. 3B shows the subroutine from the branching point B. This subroutine is initiated when it is established in inquiry 26 that the counter reading of the gear-dependent counter is higher than or equal to a limit value (N(i)>limit value). This subroutine starts at reference numeral 33 with the inquiry of whether the counter reading of the symptom counter in fourth gear exceeds the limit value. In the case of a positive inquiry, the program branches out to function block 34. In function block 34, a special program is actuated. In this special program, it is tested whether the symptoms are also detected in fifth gear. If this is the case, then an emergency program is immediately activated in order to prevent a multiple swinging between fourth and fifth gears. During activation of the emergency program, a fault entry in the diagnosis of the electronic control instrument (reference number 35) simultaneously appears. In the case of a negative inquiry, the program branches out to the inquiry of whether the counter reading in first to fourth gears has been exceeded, reference numeral 36. In the case of a negative result, the emergency program is actuated and the automatic transmission switches to the fourth gear, reference numeral 37. If the counter reading has been exceeded in the first to fourth gears, the program branches out to function block 38 where the emergency program is activated and the automatic transmission switches to fifth gear. Pressure modulated means that the gear changes do not take place a maximum pressure. Thereafter, the program goes on to the function block 39 with a fault entry in the diagnosis of the electronic control instrument. With the error entry this part of the program terminates.

Figure 3C:
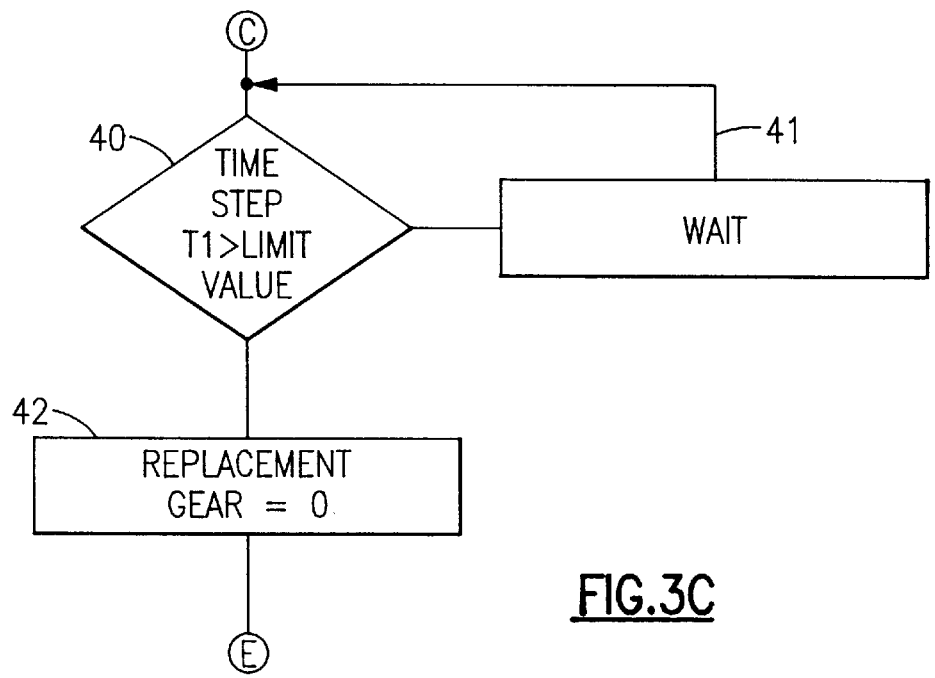

FIG. 3C shows a subroutine which is passed through when the driver's wish exceeds the replacement gear. This subroutine starts at the reference numeral 40 with the inquiry of whether the time step Ti is longer than a limit value. If the condition is not met a holding pattern 41 is passed through.

In the case of a positive inquiry, that is, the period of time T1 has been exceeded, the replacement gear is set to zero in the function block 42. Then the program branches out to the branching point E, see FIG. 3A.

Figure 3D:
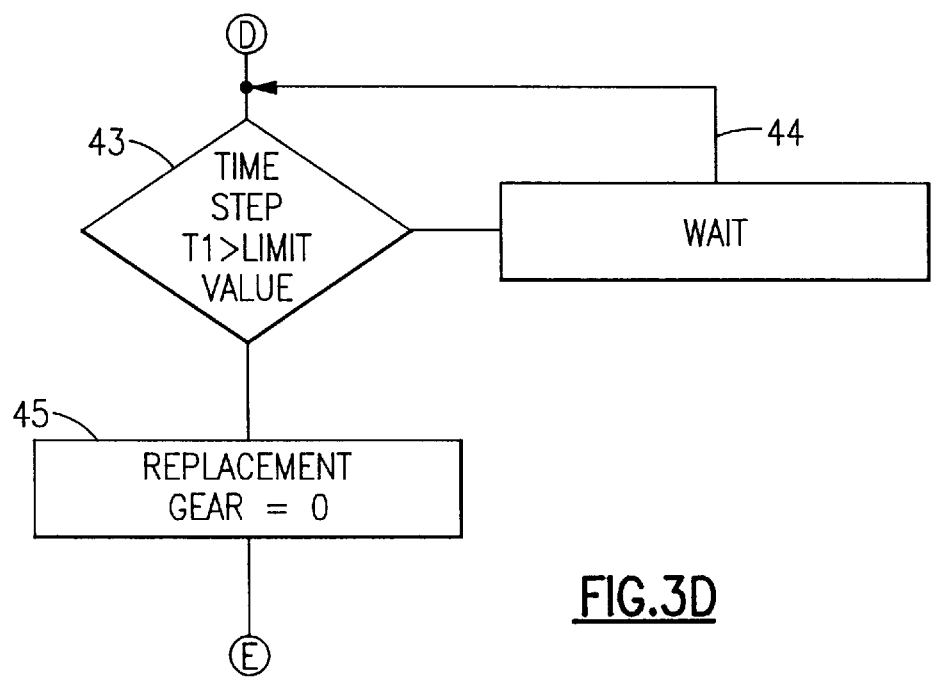

FIG. 3D shows a subroutine which is run through when both the transmission output speed and the throttle valve information are below a limit value (DKI(t)<Gw and nAB (t)<Gw). The subroutine begins with the inquiry of whether the time step T2 exceeds a limit value, reference numeral 43. If this is not the case, a holding pattern 44 is run through. In case a positive inquiry results, the replacement gear is set to zero in the function block 45. The program then branches out to branching point E, see FIG. 3A.

Figure 4:
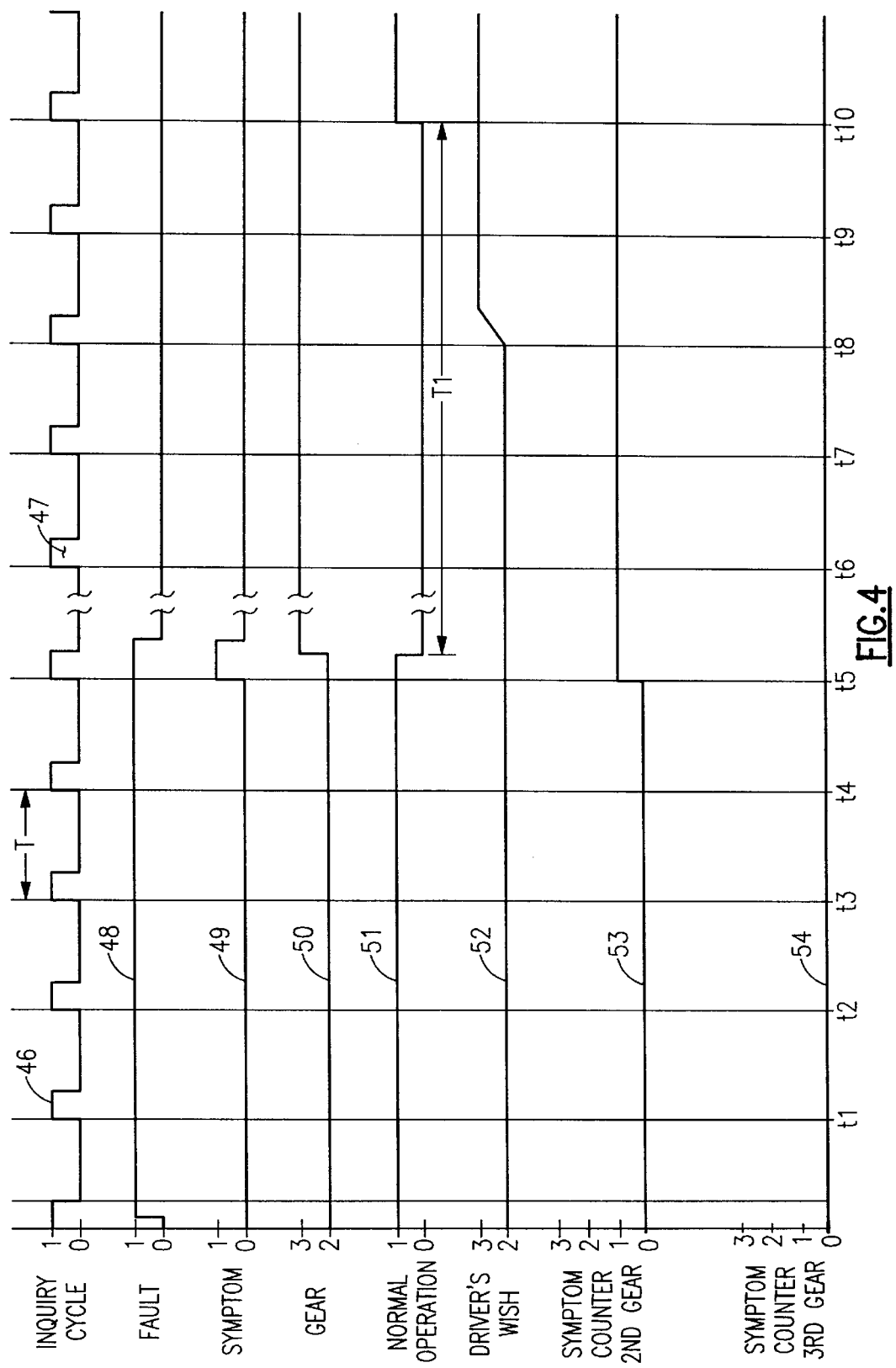
FIG. 4 is a signal phase diagram.

FIG. 4 shows the signal-time curve for several phase values. Reference numeral 46 shows the inquiry cycle. The inquiry cycle 46 is constant, for example, 10 mins. The length of time of a single pulse, reference numeral 47, corresponds to the duration needed by the microcontroller 14 to test the gear monitoring. Reference numeral 48 shows that in the range t0 to t6 a fault has appeared. Reference numeral 49 shows the signal curve of the symptom. Reference numeral 50 shows here the second and the third gears. Reference numeral 51 shows the state of normal operation wherein level 1 means that normal operation is active, and that no fault has been found. Level 0 means that normal operation has been deactivated and the replacement gear is activated. Reference numeral 52 shows an assumed course of the driver's wish. The level here corresponds to the required gear. Reference numeral 53 shows the counter reading for the symptom counter for second gear and reference numeral 54 shows the counter reading of the symptom counter for third gear. The sequence is as follows: at t0 the program cycle starts for the gear monitoring. During the program cycle it is established, for example, that a fault exists. The signal fault 48 passes from zero to one. If the fault is constantly present for a presettable time, the fault is detected as a symptom. In FIG. 4, five inquiry cycles are entered at preset times. Thus, at moment t5, for symptom 49 the signal changes from zero to one. After a symptom has been detected, it is tested, as done in FIG. 3A, whether the counter reading exceeds a limit value. In the example, it has been assumed that the counter reading for the second gear, reference numeral 53, is zero. Thus, with the detection of a symptom, the counter reading of the symptom counter is increased by one. Since the meter reading still has not reached or exceeded the limit value, for example, three, a replacement gear is thus activated. This means that the automatic transmission switches from second to third gear. In FIG. 4 this takes place during the time interval t5 and t6. At the same time, with the activation of the replacement gear, normal operation, reference numeral 51, is discontinued, that is, the level changes from one to zero. It is assumed that at moment t0, the driver actuates the accelerator pedal so that he exceeds the 2–3 upshift characteristic line. Reference numeral 52 shows such driver's wish. According to the program flow chart of FIG. 3A, after the driver's wish is above or equal to the replacement gear, a specific time is passed before the replacement gear is set to zero and the automatic transmission returns to normal operation. This delay in time between the driver's wish and the change of level of the normal operation, reference numeral 51, is shown by the time intervals t5 to t10. In the explained example, it was assumed that after the automatic transmission switched to third gear no fault or symptom was detected in third gear. This is shown by the constant curve of the symptom counter for third gear, reference numeral 54.

Figure 5:
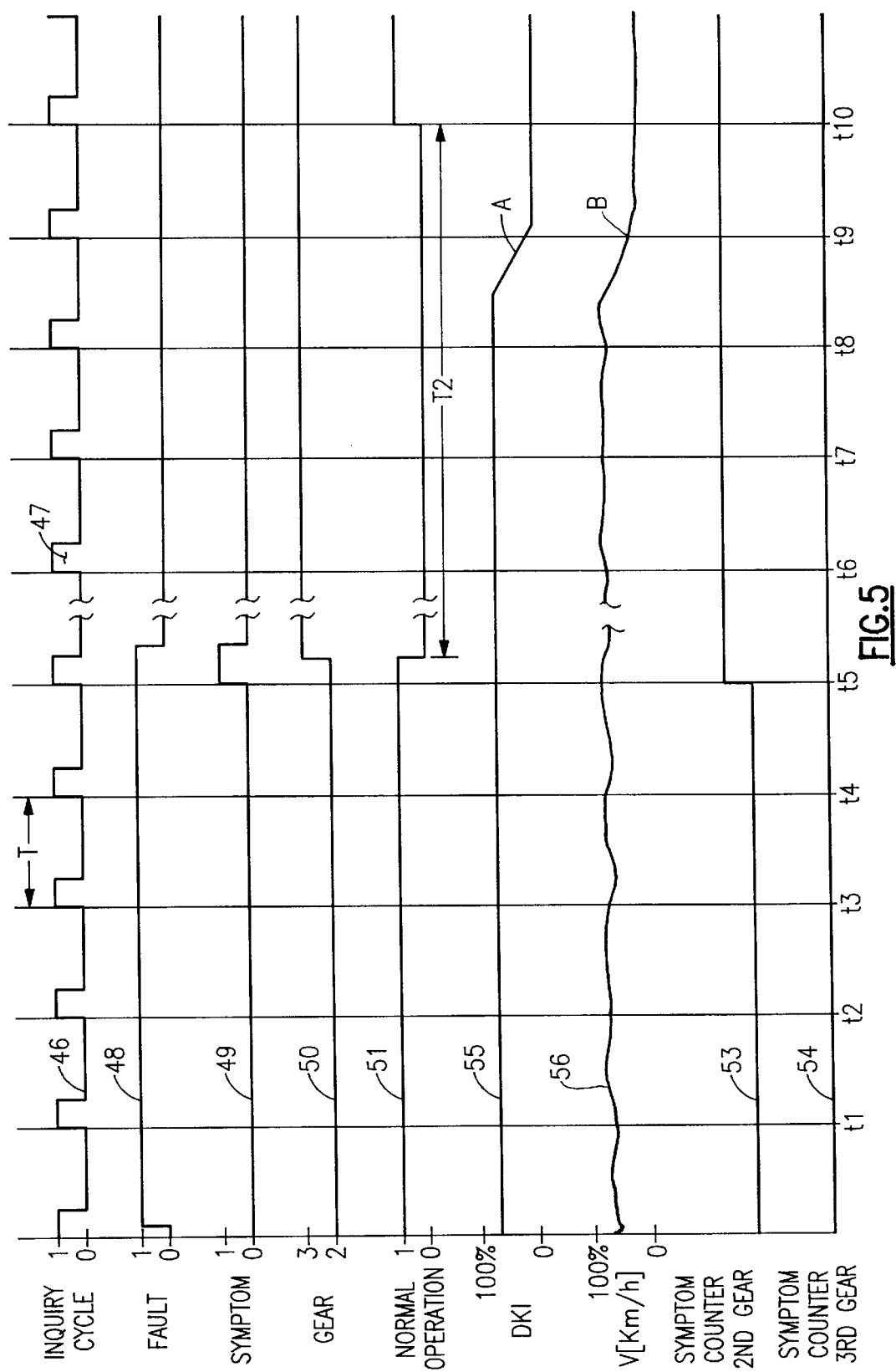
FIG. 5 is a signal phase diagram.

FIG. 5 shows another possibility for the return from replacement to normal operation. During the time intervals t0 to t5, the signal curves of the inquiry cycle 46, of the fault 48, of the symptom 49, of the gear 50, of the normal function 51, of the symptom counter for second gear, reference numeral 53, and of the symptom counter for third gear, reference numeral 54, correspond to the curve of FIG. 4. Additionally, the signal curve of the throttle valve information DKI, reference numeral 55, and the signal cover of a vehicle speed, reference numeral 56, were received. The signal value of the throttle valve information moves between 0 and 100% according to no and full throttle. The vehicle speed moves between 0 and 100% according to parking and maximum possible vehicle speed. At moment t5, a symptom is detected. The symptom counter for second gear is increased by one. Since the symptom counter for second gear has not reached or exceeded the limit value, the third gear is here switched to the replacement gear. The normal operation level, reference numeral 51, simultaneously changes with the switching. In this example, it is assumed that the driver has released the accelerator pedal, after moment t8, so that the throttle valve information DKI returns to zero from its initial value. During the time intervals t5 to t9, the throttle valve information falls below the limit value A. At the same time, the vehicle speed becomes reduced. At moment t9, the vehicle speed falls below a limit value B. After both limit values have been fallen below, the system waits for a presettable time T2. After expiration of the time step T2, the replacement gear is set to zero so that the normal operation changes its level from zero to one. The automatic transmission returns to normal function. In this example, it was also assumed that in the replacement gear, that is, in third gear, no fault appears. The symptom counter for third gear thus has a constant level of zero.

FIG. 6 shows the case where after a symptom has been detected the counter reading has reached or exceeded the limit value. During the time intervals t0 to t5, the signal curve of the inquiry cycle 46, of the fault 48 and of the symptom 49 correspond to the signal curves of FIGS. 4 and 5. Additionally included are the stepped gear progression of the automatic transmission from zero to five, reference numeral 57, and the phase signal of the emergency program, reference numeral 58. In this example, it was assumed that the symptom counter for second gear already has the initial counter value of two, reference numeral 53. At moment t5, a symptom is detected. As a consequence of this, the symptom counter for second gear is increased by one. Thereby the symptom counter for second gear reaches the limit value of three. According to the description of FIGS. 3A and 3B, in what gear the counter reading has exceeded the limit value is now tested. Since this was in second gear, the emergency program for fifth gear is activated. This can be seen from the signal curve of the emergency program, reference numeral 58. The automatic transmission thus switches from second to third gear (time intervals t5 and t7, then to fourth gear (time intervals t7 and t9) and finally to fifth gear (time intervals t9 to t10). The changes proceed sequentially and are pressure modulated. This means that the switchings are not carried out at maximum pressure. After the time interval t10, an error is entered in the diagnosis.

Reference numerals

1 driving unit
2 input shaft
3 hydrodynamic converter
4 impeller
5 turbine wheel
6 stator 7 converter coupling
8 turbine shaft
9 first planetary gear set
10 second planetary gear set
11 third planetary gear set
12 transmission output shaft
13 electronic control instrument
14 microcontroller
15 memory
16 function block control actuators
17 function block calculation
18 signal of turbine speed
19 signal of transmission output speed
20 input values
21 hydraulic control instrument
22 inquiry gear monitoring
23 inquiry symptom
24 function block
25 function block
26 inquiry counter reading
27 function block
28 function block
29 inquiry driver's wish
30 inquiry coasting operation
31 inquiry selector lever position
32 function block
33 inquiry fourth gear
34 function block special program
35 function block diagnosis entry
36 inquiry first to fourth gear
37 function block emergency program fourth gear
38 function block emergency program fifth gear
39 function block diagnosis entry
40 inquiry time step T1
41 holding pattern
42 function block
43 inquiry time step T2
44 holding pattern
45 function block
46 inquiry cycle
47 period gear monitoring
48 signal curve control
49 signal curve symptom
50 stepped gear progression gears 2 and 3
51 signal curve normal function
52 driver's wish
53 symptom counter second gear
54 symptom counter third gear
55 throttle valve information (DKI)
56 vehicle speed (v)
57 stepped gear progression gears 1 to 5
58 signal curve emergency program

We claim:

1. A method for detecting an error for an automatic transmission, the automatic transmission comprising a hydrodynamic converter (3), a plurality of couplings and brakes (A to F), a hydraulic control instrument (21), and an electronic control instrument (13), the electronic control instrument (13), in accordance with input values (18 to 20), and controlling said plurality of couplings and brakes via the hydraulic control instrument (21), wherein a transmission ratio (i) is switched by a suitable coupling-brake combination, said method comprising the steps of:

monitoring, with the electronic control instrument (13) and with the aid of the curves of the transmission input speed (nT(t)) and of the transmission output speed (nAB(t)), a current gear (GUEW=nT(t)−nAB(t)xi);

interpreting a fault in the gear monitoring, which has been present for more than a presettable period of time, as an error; and switching from the current gear (G) to a replacement gear (G') when the error appears, wherein the replacement gear corresponds to a next higher gear (G'=G+1), when the current gear (G) was one of first gear (G1), second gear (G2), third gear (G3), and fourth gear (G4) and corresponds to a next lower gear (G'=G−1) when the current gear was fifth gear (G5).

2. The method for detecting an error according to claim 1, further comprising the steps of providing an error counter (N(i)) for each gear;

increasing the counter reading by one upon the presence of an error; and activating an emergency program when the counter reading is at least equal to a limit value (N(i)>limit value).

3. The method for detecting an error according to claim 2, further comprising the step of setting the error counter (N(i)) of a gear to zero when, after switched from said gear, the transmission again returns to that gear and no error appears.

4. The method for detecting an error according to claim 2, wherein the emergency program switches to fifth gear (G5) when the counter reading (N(i)) is at least equal to the limit value in one of the first four gears (N(i)>limit value, i=1 . . . 4) and the emergency program switches to the fourth gear (G4) when the counter reading is at least equal to the limit value in the fifth gear (N(5)>limit value), and the switching is carried out by one of sequentially and pressure modulated.

5. The method for detecting an error according to claim 1, further comprising the steps of discontinuing the replacement gear (G') and returning to normal operation upon occurrence of one of:

the driver's wish corresponds to the replacement gear;

the driver moving a selector lever to one of a parking position (P), a neutral position (N), and a reverse position (R); and a vehicle speed (v(t)) and a signal of a throttle valve (DKI(t)) falls below a limit value (v(t)<limit value and DKI(t)<limit value).

6. The method for detecting an error according to claim 4, further comprising the step of entering a diagnosis phases when the emergency program is activated.

* * * * *